Figure 1:
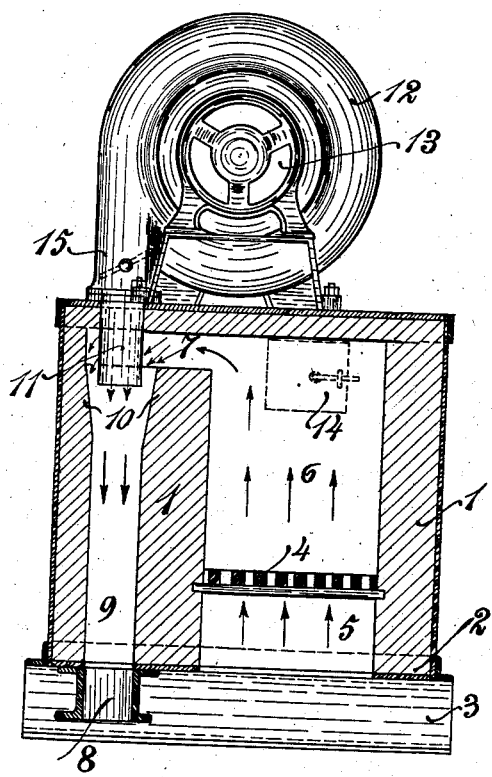

P. MONGEN.
MOLD DRYING STOVE.
APPLICATION FILED AUG. 13, 1910.

1,027,210.

Patented May 21, 1912.
2 SHEETS—SHEET 1.

P. MONGEN.
MOLD DRYING STOVE.
APPLICATION FILED AUG. 13, 1910.
1,027,210.
Patented May 21, 1912.
2 SHEETS—SHEET 2.
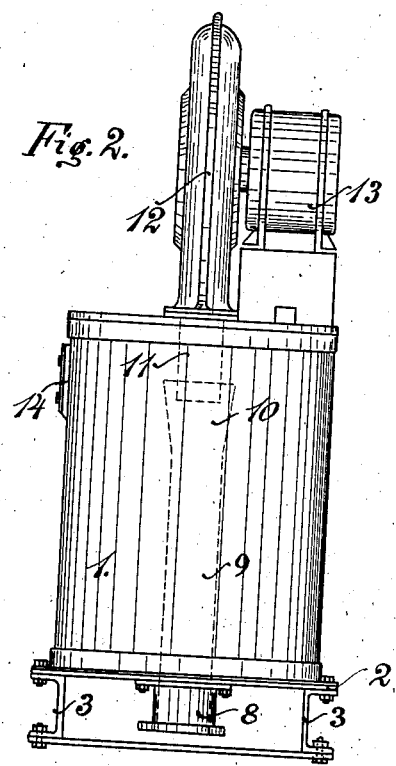
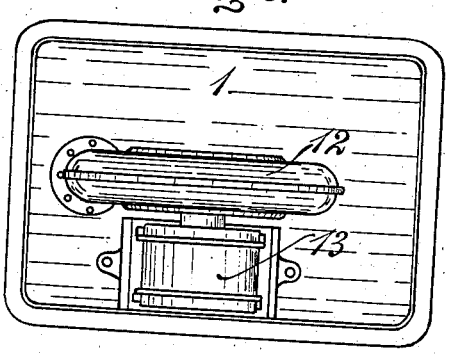
WITNESSES
INVENTOR
ATTORNEY

UNITED STATES PATENT OFFICE.

PAUL MONGEN, OF MÜLHEIM-ON-THE-RHINE, GERMANY.

MOLD-DRYING STOVE.

1,027,210.  Specification of Letters Patent.  Patented May 21, 1912.

Application filed August 13, 1910. Serial No. 577,077.

*To all whom it may concern:*

Be it known that I, PAUL MONGEN, a subject of the Emperor of Germany, residing at 72 Kalkerstrasse, Mülheim-on-the-Rhine, Germany, have invented new and useful Improvements in Mold-Drying Stoves, of which the following is a specification.

For drying the molds in foundries small portable drying ovens are used which consist of a furnace and a chamber for heating the air; in these ovens a current of compressed air is heated and then mixed with the furnace gases, whereupon it is conducted to the molds. Such ovens always entail the danger, that in consequence of an excessive supply of air beneath the grate long blue flames are produced inside the furnace and reaching even as far as the dry-air flue, or that the air is overheated and is too greatly mixed with the furnace gases before it reaches the molds, by more fresh air entering from above into the furnace than can escape through the chimney-flue and the dry-air flue respectively so that the air is pressed and will strike back into the furnace. In both instances the molds are likely to be burned, to crack or flake off. It is, indeed, possible to control the temperature and the air-supply by means of closures and dampers, so that a burning of the mold is avoided; that is, however, only possible by a constant, careful attendance by a skilled, reliable staff, which it will very rarely be possible to find.

It has been proposed to conduct the compressed air, heated in separate heating chambers to the molds through a flue leading downward on the side of the oven, and to let the waste-gas flue of the furnace enter into this hot-air flue like a branch-pipe, so that the current of hot air will aspirate the hot furnace gases, mix them with the hot air and so conduct them to the molds. This result is, however, not obtained, as the current of compressed air will not carry along the furnace gases, which are under a lower pressure, if the width of the flue remains the same, but will partly blow them out through both furnace and grate. But even in case the intended result should be obtained, also so arranged ovens would cause the molds to be burned, as there is no supply of cold air whatever. The known types of ovens further have the disadvantage, that when air is blown into and through the furnace chamber fine ashes and dust will enter into the mold, so that it will become impossible to feed fresh fuel into the furnace during the drying process, and it will be necessary to remove with much trouble the ashes in small quantities after the fire has burned out, as it will not be possible to empty the whole grate at a time, as the space beneath the same must be closable and partly also contains the compressed-air pipes, the damper-guide walls and the like.

The present invention removes all the difficulties and troubles, mentioned above.

According to the present method hot air and furnace-gases are sucked off by means of a current of cold compressed air, in given, constant quantities and mixed with the cold compressed air at a given ratio, so that the mixture conducted to the molds will have a given limited and permissible maximum temperature, whereas simultaneously and at the same ratio as hot air and gases from the furnace are sucked off, fresh air is again sucked through the grate into the furnace, so that the combustion is maintained in a uniform manner and the hot air and furnace gases sucked off from above are again replaced.

The accompanying drawing exemplifies a constructional form of an apparatus for carrying out this method.

Figure 1 is a vertical longitudinal section. Fig. 2 is a front elevation. Fig. 3 is a plan.

1 is the body of the oven, which rests with base 2 on the girders 3 and has a grate 4. Below the grate is an air chamber 5, above the same the furnace chamber 6. The horizontal waste gas flue 7 leads from the furnace chamber 6 into the upper enlarged end 10 of a dry-air flue 9, into which it enters from the side. Into the enlarged end 10 of the dry-air flue 9 leads also from above the compressed air pipe, in the present instance the delivery nozzle 11 of a blower 12, which enters vertically and concentrically into the flue 9. The dry-air flue 9 is fitted at its lower end with a mouth piece 8, and has a greater width than the nozzle 11.

For practical reasons the blower 12 with the motor 13 have been mounted on the top of the oven-body 1. The charging door 14 is provided for charging the fuel on to the grate 4. A lid 15 prevents hot gases from rising into the blower 12, when the oven is shut down after work, and the hot air is to be removed by opening the door 14. When the blower 12 is started, after the mouth piece 8 of the dry-air flue 9 has been tightly joined to the runner of the mold, the blast descending in a vertical direction in the dry-air flue 9 will have an aspirating effect on the communicating flue 7, so that hot air is sucked from the furnace chamber 6, while simultaneously combustion air is drawn from the outside through the grate and to the fire. Therefore the same quantity of air is conducted down to the fire, as is sucked off from above, so that all controlling by means of dampers may be dispensed with. It is therefore quite out of question for long blue flames to be produced, for the air to be pressed and strike back into the furnace chamber 6 in consequence of an insufficient supply of fresh air from below, and that the drying air is overheated. By determining from the very first the proper shape and degree of the enlargement 10 of the flue 9 and the ratio between its area and that of the compressed-air supply pipe it will be possible to give the warm mixture of air and gas produced in the dry-air flue 9 a certain maximum temperature which will not affect the mold, and to maintain the air and gas mixture permanently at such temperature.

The invention furthermore affords the following advantages. Fresh fuel can be charged into the furnace during the drying process without the compressed-air pipe having to be shut off, as no hot-air, carrying smoke and fine ashes with it, will be forced out when the door 14 is opened for such purpose. As the dry air is carried along by the cold air entering in a permanently constant quantity and a slow current, so that a uniform suction is produced over the whole grate area, it is out of question, that ashes and the like can get into the mold and stick in places which are later on no more accessible. The separate air-chamber 5 below the grate 4, which hitherto had to be of a considerable height for allowing of a supply of a part of the air from the blower and for admitting of the pipes, closure and regulating dampers being arranged here, may be dispensed with in the arrangement according to the present invention as the grate 4 may be placed immediately in the level of the base 2 or close above it. The oven can therefore be constructed lower than hitherto, namely by the height of the under-grate air chamber 5, which is nevertheless shown in the drawing. This reduction in height will amount to about 15 centimeters or 6 inches. In consequence thereof and also by the fact that no special blast distributing conduits to the grate and the necessary dampers are required the furnace may be made both of a smaller size and at a lower cost.

I claim:

A mold drying apparatus comprising in combination, a combustion chamber provided with a grate and having an open air inlet to the grate from below, a vertically disposed air conduit having an enlarged upper end communicating with said chamber at a point above the grate, means connecting the discharge of said conduit with the runner of the mold, and means projecting into the upper enlarged end of said conduit and forcing the air downwardly therethrough into the mold thereby inducing a mixture with such air of the products of combustion from said chamber.

In testimony whereof I hereto affix my signature in presence of two witnesses.

PAUL MONGEN.

Witnesses:
 WALTER MONGEN,
 OSCAR DEPNER.